United States Patent [19]
Thompson

[11] Patent Number: 5,559,494
[45] Date of Patent: Sep. 24, 1996

[54] TRANSMISSION OIL MONITOR SYSTEM

[75] Inventor: Scott M. Thompson, Zionsville, Ind.

[73] Assignee: General Motors Corporation, Detroit, Mich.

[21] Appl. No.: 992,677

[22] Filed: Dec. 18, 1992

[51] Int. Cl.$^6$ ..................................... B60Q 1/00
[52] U.S. Cl. ................ 340/439; 340/457.4; 340/438; 340/449; 364/424.03
[58] Field of Search ............... 340/439, 457.4, 340/438, 462, 449, 450.3; 364/424.03, 424.04, 550, 569, 551.01, 552; 73/117.3, 64; 123/196 R, 196 S; 184/1.5, 6.5–6.8

[56] References Cited

U.S. PATENT DOCUMENTS

| | | | |
|---|---|---|---|
| 4,629,334 | 12/1986 | Hochstein | 340/622 |
| 4,677,847 | 7/1987 | Sawatari et al. | 340/449 |
| 4,742,476 | 5/1988 | Schwartz et al. | 340/457.4 |
| 4,847,768 | 7/1989 | Schwartz et al. | 340/452.4 |
| 4,970,492 | 11/1990 | King | 340/450.3 |
| 5,060,156 | 10/1991 | Vajgart et al. | 340/449 |

*Primary Examiner*—Jeffery Hofsass
*Assistant Examiner*—Nina Tong
*Attorney, Agent, or Firm*—Donald F. Scherer

[57] ABSTRACT

A method and apparatus as presented for monitoring the condition of oil in a transmission to present a service indicia prior to the time that the oil life has been spent. A thermosensor and a tachometer are associated with the transmission to present respective output signals correlated with operating temperature and transmission revolutions. The revolutions of the transmission are weighted as a function of the deviation of the temperature from a temperature standard. The resulting effective revolutions are then applied to a down counter which is initially loaded to the number of allowable effective revolutions when the transmission oil is changed or the transmission serviced. When the down counter has counted out, a message is displayed indicating the need for service.

3 Claims, 3 Drawing Sheets

TRANSMISSION OIL MONITOR SYSTEM

TECHNICAL FIELD

The invention herein resides in the art of power transmission devices and, more particularly, to vehicle transmissions for interconnecting an engine or other power source with an appropriate drive train. Specifically, the invention relates to a method and apparatus for monitoring transmission operation and for determining when the transmission oil is in need of replacement or service.

BACKGROUND ART

It is well known that the lubricating capabilities of transmission oils greatly impact the reliability and durability of the transmission. The lubricating ability degrades or reduces with transmission operation and over time. Accordingly, most transmission manufacturers provide guidelines for determining when the transmission oil should be changed. Such guidelines typically are stated alternatively with respect to a measurable period of operation or a period of time.

Typically, the frequency of necessary oil changes is determined by the severity of the service to which the transmission is put, considered in light of the filter equipment installed. Though most transmissions have associated guidelines for the frequency of oil changes or service, more frequent changes are generally required when the transmission operation is subject to high levels of contamination or overheating. Indeed, depending upon the transmission operating conditions, the oil change interval may be as short as 50 percent of the guidelines or may exceed the guidelines by 200 percent or more. It has been found that excessive degradation of the transmission oil occurs at high temperatures. At elevated transmission oil temperatures, antioxidants in the oil become depleted and the oil becomes more viscose and acidic due to the oxidation.

In the prior art, it has been the general rule that transmission oil changes have taken place at periodic intervals measured either on the basis of time as measured by the calendar, or on the basis of operation, as measured either by the number of miles the vehicle has traveled or the number of hours it has operated. In such systems, the oil change has generally taken place based on either time or operation, whichever criteria is satisfied first. However, employing the prior art techniques, no consideration was given to one of the most critical factors, the operating temperature of the transmission oil.

Since the prior art relied upon either a period of operation or a chronological measurement for determining the need for oil change, the technique was typically inefficient and ineffective. Oil changes would rarely be undertaken at the optimum time, but would be either made too early or too late, both being costly to the operator. Additionally, the prior art simply did not take into account the operating temperature of the oil and the impact that such temperature would have on oil degradation. Finally, the prior art did not provide any means for automatically indicating to the vehicle operator the need for the change, nor did it provide the operator with a means for periodically monitoring the state of the transmission oil system and any approaching need for change or service.

DISCLOSURE OF INVENTION

In light of the fore, going, it is a first aspect of the invention to provide a transmission oil monitor system which is efficient and effective in use.

Another aspect of the invention is the provision of a transmission oil monitor system which assures timely oil changes and service.

Yet an additional aspect of the invention is the provision of a transmission oil monitor system which compensates for and gives due consideration to the temperature of the transmission oil during operation.

A further aspect of the invention is the provision of a transmission oil monitor system which allows for monitoring of oil conditions and provides means for projecting a need for change or service.

Yet an additional aspect of the invention is the provision of a transmission oil monitor system which provides an indicia to the operator that a change or service is needed.

The foregoing and other aspects of the invention which will become apparent as the detailed description proceeds are achieved by an apparatus for monitoring the condition of oil in a transmission, comprising: first means connected to the transmission for sensing an actual number of revolutions of the transmission during transmission operation; second means connected to the transmission for sensing the temperature of the oil during said operation; third means connected to said first and second means for generating an effective number of transmission revolutions during said operation, said effective number comprising said actual number weighted as a function of said temperature; and fourth means connected to said third means for totaling said effective number of revolutions over a course of transmission operations and producing an indicia that servicing of the oil is required when said total of said effective number of revolutions exceeds a particular level.

Further aspects of the invention which will become apparent herein are attained by a method for monitoring the condition of oil in a transmission, comprising: counting art actual number of transmission revolutions during transmission operation; measuring the temperature of the oil during said operation; determining an adjustment factor as a function of a deviation of said temperature from a reference temperature; determining an effective count of transmission revolutions during said transmission operation by adjusting said actual number as a function of said adjustment factor; totaling said effective count of transmission revolutions during successive periods of said transmission operation; and generating a signal indicating a need for oil service when said total effective count exceeds a particular level.

Still further aspects of the invention which will become apparent herein are attained by apparatus for monitoring the condition of oil in a transmission, comprising: a first sensor connected to the transmission and providing a first output corresponding to :an actual number of transmission revolutions; a second sensor connected to the transmission and providing a second output corresponding to the temperature of the oil; means connected to said first and second sensors and receiving said first and second outputs therefrom for generating a third output corresponding to an effective number of transmission revolutions, said effective number comprising said actual number weighted by said temperature; a counter connected to said means and receiving said third output, said counter totalling said effective number of revolutions during operation of said transmission; and display means connected to said counter for providing an indicia of said total of said effective number of revolutions and for producing an indicia of a need for oil service when said total exceeds a particular threshold.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
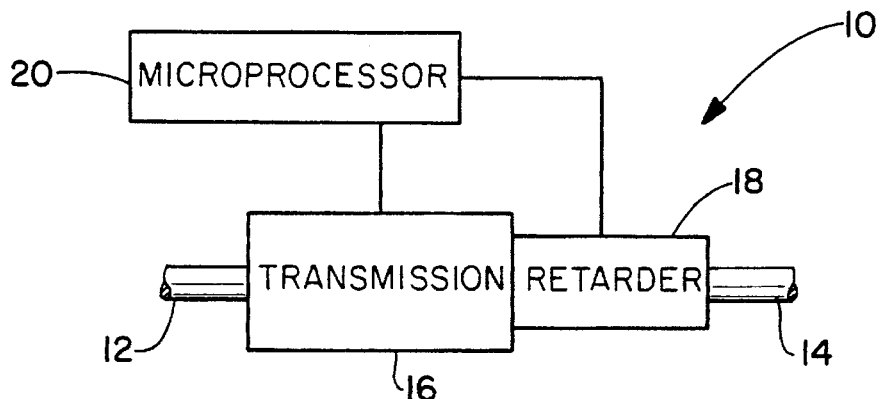
FIG. 1 is a block diagram of a vehicle transmission adapted for employing the invention.

Referring now to the drawings and more particularly FIG. 1, it can be seen that a transmission system for employing the concept of the invention is designated generally by the numeral 10. In the preferred embodiment of the invention, the transmission is that of a motor vehicle having a power input shaft 12 which is typically attached to an appropriate power source such as a gasoline or diesel engine. A power output shaft 14 is provided for interconnection with the vehicle wheels or other appropriate driven member. Interconnected between the input shaft 12 and output shaft 14 is a transmission 16 of an appropriate nature. Those skilled in the art will appreciate that the transmission 16 will typically incorporate a plurality of gear stages and clutch packs to achieve the necessary transmission of power between the shafts 12, 14.

An appropriate retarder 18 may be attached to the power output shaft 14 to serve in vehicle braking or the like. Such retarders are well known and understood by those skilled in the art and may typically comprise a hydrostatic unit including a modulated fluid pump or the like. A dedicated microprocessor 20 is typically employed to control the operation of the transmission 16 and the retarder 18 in standard fashion. Such a microprocessor 20 is referred to in the art as an electronic control unit, serving to control the shifting of the clutch packs of the transmission 12 and the application and release of the retarder 18. In that regard, the microprocessor 20 monitors transmission speed at either the input shaft 12 or output shaft 14, and may also be employed to monitor the operating temperature of the transmission oil. It is presently contemplated that such units may also be employed to monitor the volume of the oil within the transmission itself.

Figure 2:
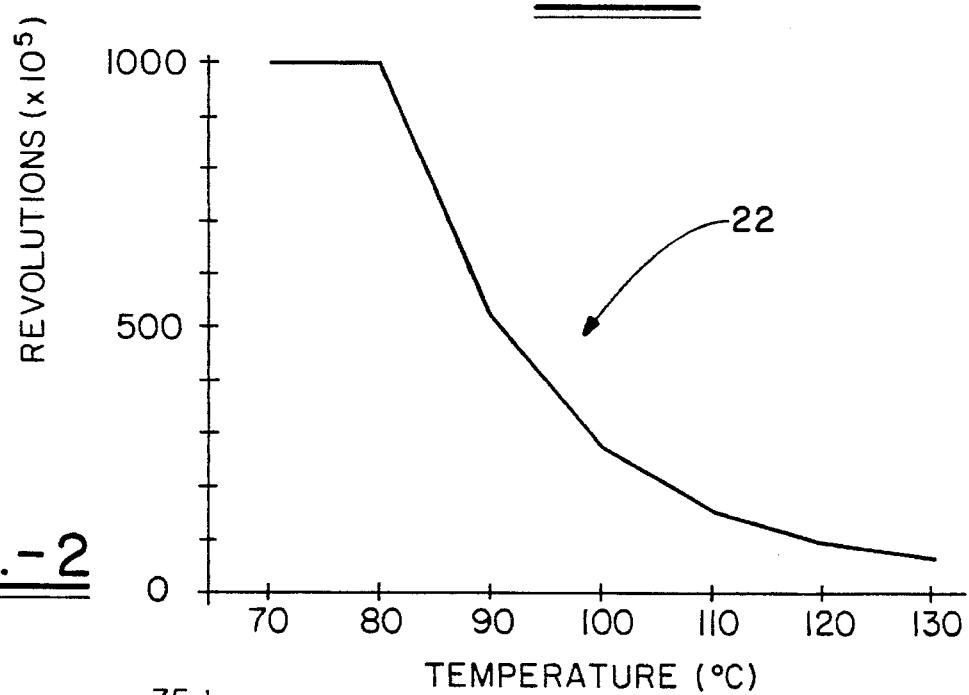
FIG. 2 is a graph illustrating transmission oil life as a function of temperature.

Applicant has found that the need for an oil change in a unit such as the transmission 16 may be determined by monitoring the temperature of the transmission oil during operation and by further monitoring the number of revolutions of the transmission as determined at either the input shaft 12 or output shaft 14. As shown in FIG. 2, it has been found that oil change intervals are inversely related to oil temperature, the acceptable operational period of the transmission oil reducing as the operational temperature of the oil increases. The graph 22 of FIG. 2 demonstrates transmission oil life as a function of operating temperature of the transmission oil (horizontal coordinate) and the number of transmission revolutions (vertical coordinate). For a typical transmission, there is a threshold temperature below which ideal operating conditions for oil life have been found to exist, and above which it has been found that oil life has been greatly reduced. For example, as shown in FIG. 2, when the oil temperature is below approximately 80° C., the transmission oil life is on the order 100,000,000 revolutions. However, as the temperature rises above 80° C., the oil life diminishes such that at above 120° C. the transmission oil life is only approximately 10,000,000 revolutions, or 10 percent of that in the ideal range of 80° C. or below. For the transmission depicted in FIG. 2, it was generally found that at operating temperatures exceeding 90° C., resulting from severe duty cycles, heavy operation loading, inadequate cooling, or the like, the period of time between required oil changes is greatly reduced as a consequence of the resultant oil oxidation and viscosity increases.

Those skilled in the art would readily appreciate that if an operator simply determined to change the transmission oil on the basis of miles or transmission revolutions, without giving regard to the temperature of the transmission oil during operation, severe damage to the transmission could result. For example, the operator might choose to change the oil at every 100,000,000 revolutions, the frequency of change or service which would be appropriate if the transmission were operating in its ideal temperature range. However, if the transmission oil were actually operating at 100° C., the useful life of the transmission oil would have been spent by 30,000,000 revolutions and excessive transmission wear may have resulted. Consequently, applicant has determined that due consideration need be given not only to the number of transmission revolutions experienced by the oil, but also to the operational temperature thereof.

Figure 3:
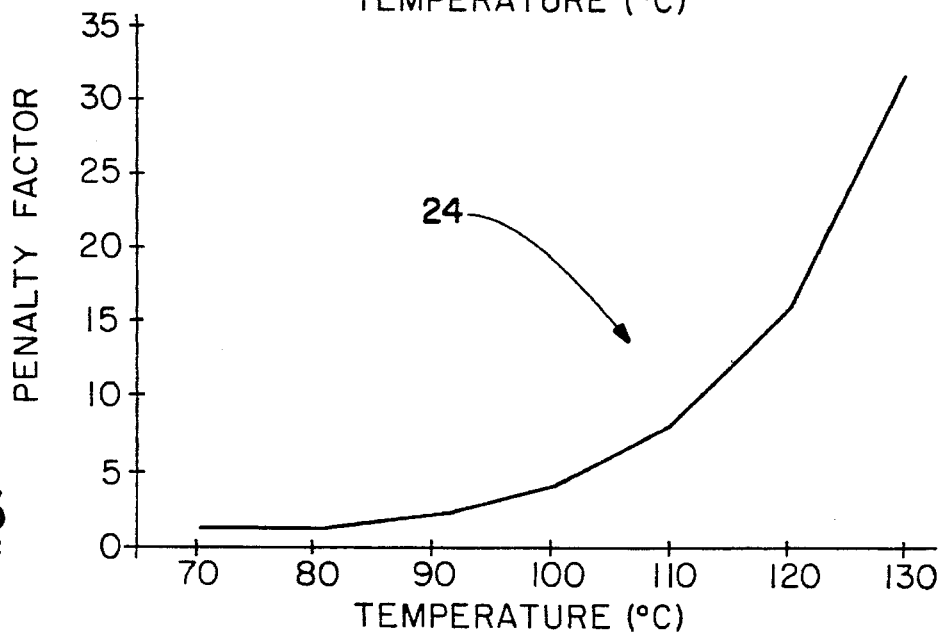
FIG. 3 is a graph demonstrating a normalization or adjustment factor curve as determined according to the invention as a function of oil temperature.

In view of the transmission oil life curve 22 of FIG. 2, demonstrating the relationship between temperature and transmission revolutions on oil life, it is apparent that any monitoring of transmission operation to determine the need for oil change or service must take into account not only the transmission revolutions, but also the temperature, of the oil. Accordingly, any monitoring of actual transmission revolutions must be weighted on the basis of temperature. In FIG. 3, the graph 24 presents a normalization curve or an adjustment factor which may be employed to correlate effective transmission revolutions to actual transmission revolutions as a function of temperature. The curve of FIG. 3 is derived from that of FIG. 2 and provides a multiple which may be employed to weight the transmission revolutions experienced at elevated temperatures when transmission oil condition is monitored; as a function of such revolutions. As shown in FIG. 3, the graph 24 is rather flat below 80° C., providing for a unity adjustment or temperature penalty factor. In other words, below 80° C., the effective revolutions and the actual revolutions are the same, for the operating temperature range is ideal. As the temperature increases above the 80° C. level, the effect of each transmission revolution on oil life increases somewhat exponentially, as should be apparent from FIG. 2.

Figure 4:
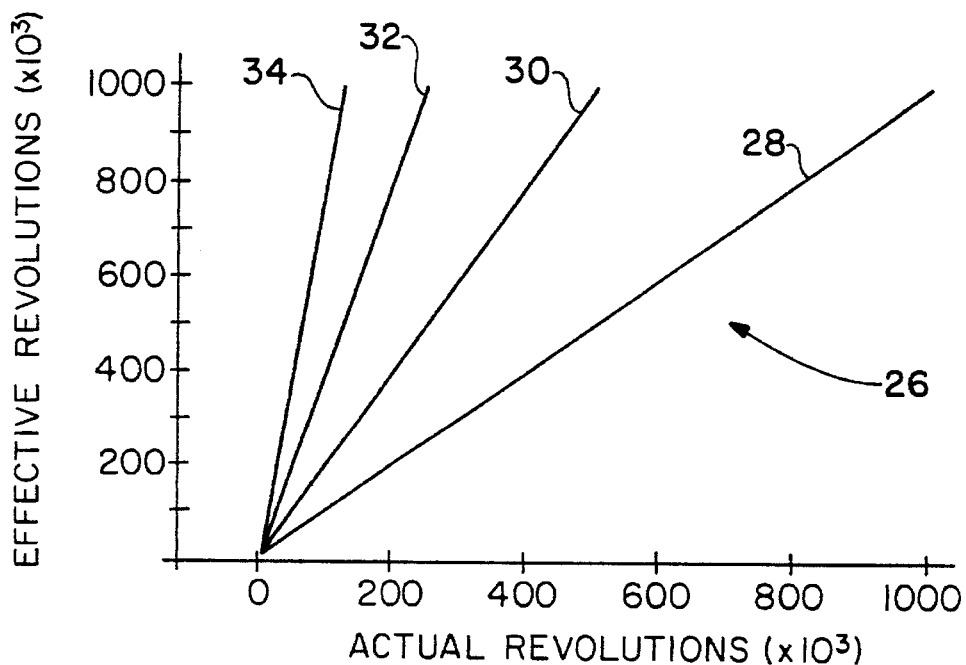
FIG. 4 illustrates a family of curves demonstrating effective revolutions as a function of actual revolutions in a transmission compensating for oil temperature according to the invention.

From the normalization curve 24 of FIG. 3, a family of curves 26 may be generated as shown in FIG. 4. Each of the curves of the family 26 correlates effective revolutions against actual revolutions at a different operating oil temperature. The graph 28 has an associated adjustment or penalty factor of 1, showing that the effective revolutions and the actual revolutions are the same or bear a 1:1 relationship. It will be appreciated that the graph 28 results from operating temperatures of 80° C. or below.

The graph 30 of FIG. 4 is for operating temperatures on the order of 90° C., and shows approximately a 2:1 relationship or correlation of effective revolutions to actual revolutions. Accordingly, an adjustment or penalty factor of 2 is apparent in this range, each revolution of the transmission at a 90° temperature having the same effect on oil life as two revolutions would have at an ideal temperature of below 80° C.

The graph 32 demonstrates the correlation of effective to actual transmission revolutions when operated at 100° C., the same demonstrating a 4:1 relationship for a penalty or adjustment factor of 4. Finally, the graph 34 shows an 8:1 ratio between effective and actual revolutions when operated at 110°, resulting in an adjustment or penalty factor of 8.

It should be appreciated from FIG. 4 that for any given operating temperature, a generally linear relationship exists between the effective and actual transmission revolutions, the slope of the graph being the adjustment or penalty factor associated with that temperature. The adjustment or penalty factor is the effective multiple for accelerated exhaustion of the oil. For instance, oil will need to be changed after half as many revolutions at 90° C. as it would when operating at below 80° C.

Figure 5:
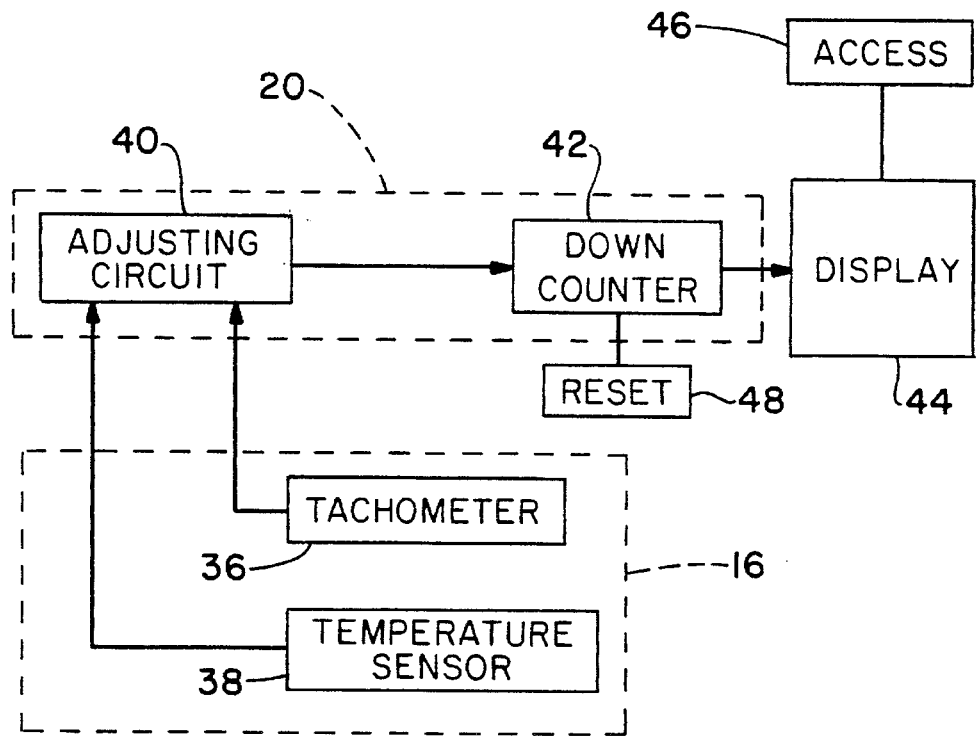
FIG. 5 is block diagram illustrating the apparatus of the invention for monitoring the condition of transmission oil.

With a knowledge of the family of curves 26 of FIG. 4 and the generally linear relationship between effective and actual transmission revolutions as a function of temperature, one may monitor the operation of the transmission 16 and determine when oil change or service is necessary by monitoring and counting the actual revolutions of the transmission and weighting them as a function of temperature. As shown in FIG. 5, a tachometer or other revolution sensor 36 may be provided in association with the transmission 16 to provide an output signal for each revolution thereof. Of course, the tachometer 36 may be interconnected with the input shaft 12 or output shaft 14 in somewhat standard fashion. Also associated with the transmission 16 may be an appropriate thermal sensor 38 such as a thermocouple or the like which is maintained in the oil reservoir of the transmission 16, presenting an output signal of an amplitude correlated with the instantaneous temperature of the transmission oil. The output signals of the tachometer 36 and temperature sensor 38 are passed to the dedicated microprocessor 20 in which the data of FIG. 4 may be maintained in a look-up table or the like. Consequently, the revolutions of the transmission sensed by the tachometer 36 may be weighted as a function of the temperature of the transmission oil sensed by the thermosensor 38. At an appropriate adjusting circuit or multiplier 40, each revolution of the transmission is adjusted by a penalty factor or adjustment factor from the family of curves of FIG. 4 which are stored in the microprocessor 20, the output of the multiplier 40 thus being the temperature-adjusted number of revolutions sensed by the tachometer 36. The weighted value or effective, revolutions comprises the output of the multiplier 40.

According to the instant invention, a down counter 42 is loaded with a count at the time the oil of the transmission 16 is changed and is counted down by the effective revolution output signal of the multiplier 40. Accordingly, at any point in time the count maintained in the down counter 42 correlates with the number of effective revolutions which may be experienced by the oil of the transmission 16 before a change or service is required. When the down counter 42 reaches zero, an output signal is passed to a display 44 which may be maintained in the cab of the associated vehicle. The display would typically advise the operator that ant oil change is necessary, such display being in the form of any appropriate indicia. It is contemplated that the display 44 may comprise an actual printed message, or it may simply comprise a lamp which becomes illuminated.

It is also contemplated as a portion of the invention that an operator may actuate the display 44 at any time by means of an access line or switch 46 connected to a button or the like. When so actuated, the display 44 would give a visual indication of the number of effective revolutions still remaining before service is required. It is further contemplated that the down counter 42 may be reset by an appropriate reset button or the like connected to the input line or switch 48 when the oil is changed or service completed. Upon reset, the down counter 42 is reloaded to the number of effective revolutions allowed between service intervals.

It is also contemplated as a portion of the invention that a service indicia may be provided on the display 14 in the event that an acceptable period of time between service intervals has expired, even though the allowed number of affective revolutions has not been experienced. For such purposes, the microprocessor 20 would simply employ a real time clock or the like. In any event, when service is necessary an appropriate message is displayed at 44 by any appropriate means such as an LED display, liquid crystal, or simply a warning lamp.

Figure 6:
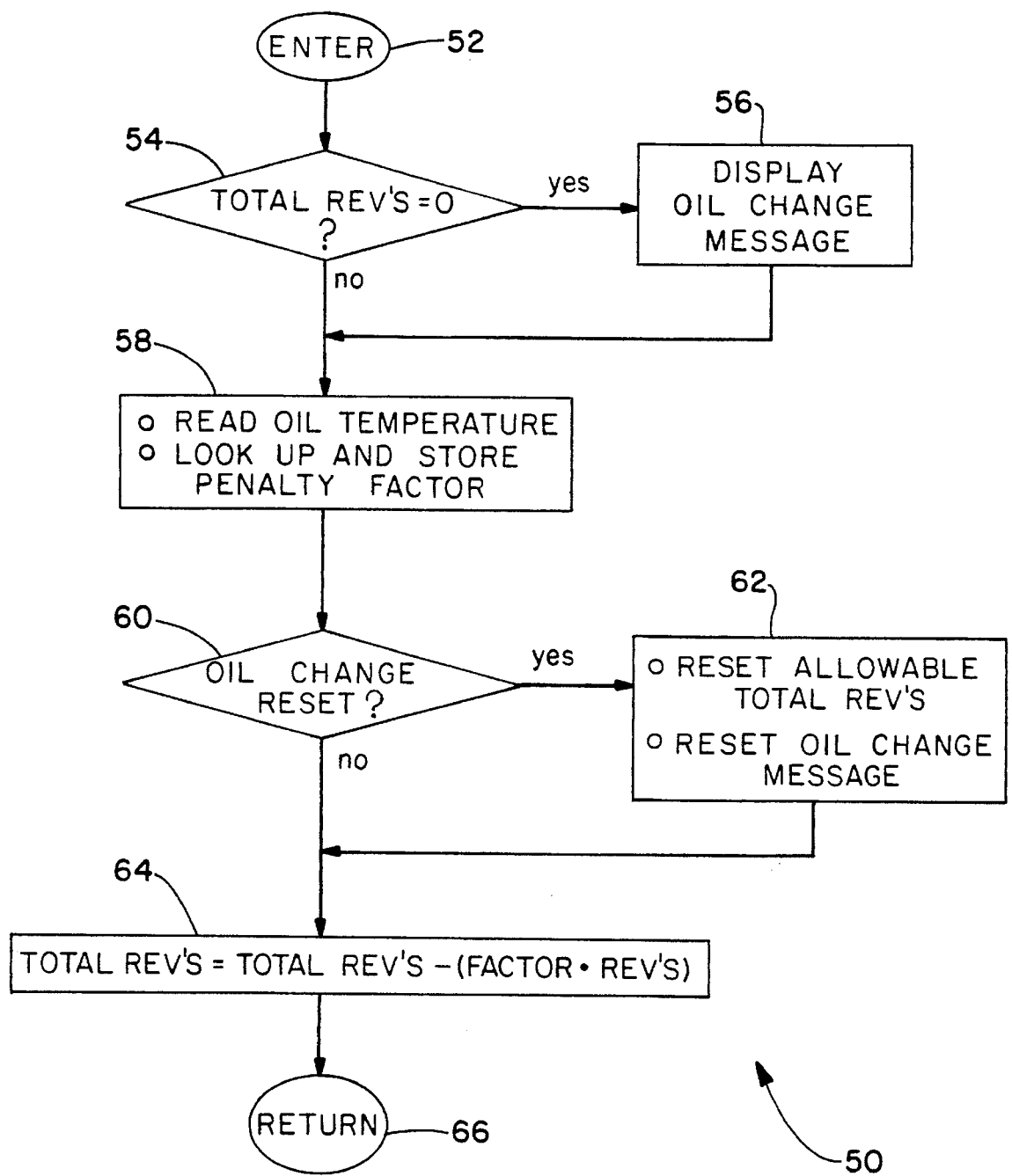
FIG. 6 is a flow chart of the method of the invention employing the apparatus of FIG. 5.

With reference now to FIG. 6, it can be seen that the process for monitoring transmission oil condition according to the invention is designated generally by the numeral 50. Of course, the process 50 is performed by the microprocessor or electronic control unit 20. The process is entered at 52 and the determination is made at 54 as to whether the total effective revolutions remaining in the down counter 42 has reached zero. If it has, the display 44 is energized as at 56 to display the appropriate oil change message. If an effective count remains in the down counter 42, the process 50 continues to 58 where the oil temperature is read from the sensor 38 and the associated penalty factor is determined from the look-up chart or family of curves 26 of FIG. 4.

A determination is made at 60 as to whether the reset button 48 has been actuated, indicating that an oil change or service has just been completed. If such is the case, the down counter 42 is reset to the total allowable effective revolutions and the oil change message of the display 44 is changed or erased. If the oil change reset button 48 has not been actuated, the process continues to where the down counter 42 is updated by decrementing the count therein by the revolutions sensed by the tachometer 36 adjusted by the penalty or adjustment factor associated with the temperature sensed at 38. Such process is taken at 64 as shown. After the down counter 42 is updated, the process returns as at 66 to the process block 52 and the process continues.

In a preferred embodiment of the invention, the down counter 42 is typically reset at a service interval with a count therein equivalent to approximately 90 percent of the number of effective revolutions allowable. Accordingly, the down counter 42 counts out at a time when 10 percent of the allowable effective revolutions remain, such that the operator will be given sufficient time to schedule the necessary service while still operating within the useful life of the transmission oil. Of course, the access button 46 allows an operator to periodically display the status of the down counter 42 to project when service will be required. Accordingly, the concept of the invention extends to resetting of the down counter 42 with the full compliment of effective revolutions allowed, or with some percentage thereof which will display the service message on the display 44 prior to the time that such service is mandatory.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to following claims.

What is claimed is.

1. Apparatus for monitoring the condition of oil in a transmission, comprising:

first means connected to the transmission for sensing an actual number of revolutions of the transmission during transmission operation;

second means connected to the transmission for sensing the temperature of the oil during said operation;

third means connected to said first and second means generating an effective number of transmission revolutions during said operation, said effective number comprising said actual number weighted as a function of said temperature, said effective number being derived from said actual number as a linear function of said temperature of said oil, said function establishing a penalty factor multiplier which increases with increasing temperature, said effective number being said actual number multiplied by said penalty factor; and fourth means connected to said third means for totalling said effective number of revolutions over a course of transmission operations and producing an indicia that servicing of the oil is required when said total of said effective number of revolutions exceeds a particular level.

2. A method for monitoring the condition of oil in a transmission, comprising:

counting an actual number of transmission revolutions during transmission operation;

measuring temperature of the oil during said operation;

determining an adjustment factor as a function of a deviation of said temperature from a reference temperature;

determining an effective count of transmission revolutions during said transmission operation by adjusting said actual number as a function of said adjustment factor, said effective count being derived from said actual number as a linear function of said temperature of said oil, said function establishing said adjustment factor, said adjustment factor increasing with increasing temperature, said effective count being said actual number multiplied by said adjustment factor;

totaling said effective count of transmission revolutions during successive periods of said transmission operation; and generating a signal indicating a need for oil service when said total effective count exceeds a particular level.

3. Apparatus for monitoring the condition of oil in a transmission, comprising:

a first sensor connected to the transmission and providing a first output corresponding to an actual number of transmission revolutions;

a second sensor connected to the transmission and providing a second output corresponding to the temperature of the oil;

means connected to said first and second sensors and receiving said first and second outputs therefrom for generating a third output corresponding to an effective number of transmission revolutions, said effective number comprising said actual number weighted by said temperature, said effective number being derived from said actual number as a linear function of said temperature of said oil, said function establishing a penalty factor, multiplier which increases with increasing temperature, said effective number being said actual number multiplied by said penalty factor;

a counter connected to said means and receiving said third output, said counter totalling said effective numbers of revolutions during operation of said transmission; and display means connected to said counter for providing an indicia of said total of said effective number of revolutions and for producing an indicia of a need for oil service when said total exceeds a particular threshold.

* * * * *